US010571724B2

(12) United States Patent
Ma et al.

(10) Patent No.: US 10,571,724 B2
(45) Date of Patent: Feb. 25, 2020

(54) ELECTROOPTIC MODULATOR

(71) Applicant: ETH ZÜRICH, Zürich (CH)

(72) Inventors: Ping Ma, Zürich (CH); Jürg Leuthold, Oberweningen (CH)

(73) Assignee: ETH ZÜRICH, Zürich (CH)

( * ) Notice: Subject to any disclaimer, the term of this patent is extended or adjusted under 35 U.S.C. 154(b) by 0 days.

(21) Appl. No.: 15/562,137

(22) PCT Filed: Mar. 30, 2016

(86) PCT No.: PCT/CH2016/000055
§ 371 (c)(1),
(2) Date: Sep. 27, 2017

(87) PCT Pub. No.: WO2016/154764
PCT Pub. Date: Oct. 6, 2016

(65) Prior Publication Data
US 2018/0081204 A1    Mar. 22, 2018

(30) Foreign Application Priority Data

Apr. 1, 2015    (CH) .......................................... 467/15

(51) Int. Cl.
*G02F 1/035*    (2006.01)
*G02F 1/225*    (2006.01)
(Continued)

(52) U.S. Cl.
CPC ............ *G02F 1/035* (2013.01); *G02F 1/0027* (2013.01); *G02F 1/0508* (2013.01); *G02F 1/225* (2013.01);
(Continued)

(58) Field of Classification Search
CPC .................................. G02F 1/035; G02B 6/00
(Continued)

(56) References Cited

U.S. PATENT DOCUMENTS 6,614,960 B2 *   9/2003   Berini .................... B82Y 20/00
                                                            369/275.1
6,741,782 B2 *   5/2004   Berini .................... B82Y 20/00
                                                            385/129
(Continued)

OTHER PUBLICATIONS

International Preliminary Report on Patentability dated Oct. 3, 2017 (dated Oct. 3, 2017), Application No. PCT/CH2016/000055, 7 pages.
(Continued)

*Primary Examiner* — Kaveh C Kianni
(74) *Attorney, Agent, or Firm* — Rankin, Hill & Clark LLP

(57) ABSTRACT

An electro-optic element includes a first waveguide, which is a plasmonic waveguide, including a first core having a ferroelectric material and a cladding having a first cladding portion. The first cladding portion includes, at a first interface with the ferroelectric material, a first cladding material. The electro-optic element includes a first and a second electrode for producing an electric field in the ferroelectric material when a voltage is applied between the first and second electrodes, for modulating a real part of a refractive index of the ferroelectric material. The element includes, in addition, a crystalline substrate on which the ferroelectric material is epitaxially grown with zero or one or more intermediate layers present between the substrate and the ferroelectric material. The element may have a second waveguide, which is a photonic waveguide, including for enabling evanescent coupling between the first and second waveguides.

17 Claims, 5 Drawing Sheets

(51) Int. Cl.
*G02F 1/05* (2006.01)
*G02F 1/00* (2006.01)
*G02B 6/00* (2006.01)
*G02F 1/21* (2006.01)

(52) U.S. Cl.
CPC .. *G02F 2001/212* (2013.01); *G02F 2001/213* (2013.01); *G02F 2203/10* (2013.01)

(58) Field of Classification Search
USPC .......................................................... 385/3
See application file for complete search history.

(56) References Cited

U.S. PATENT DOCUMENTS

| | | | | |
|---|---|---|---|---|
| 6,801,691 | B2* | 10/2004 | Berini | B82Y 20/00 385/147 |
| 6,956,651 | B2* | 10/2005 | Lackritz | G01N 21/253 356/445 |
| 6,977,767 | B2* | 12/2005 | Sarychev | B82Y 20/00 359/290 |
| 7,043,134 | B2* | 5/2006 | Berini | G02B 6/12007 385/147 |
| 7,076,138 | B2* | 7/2006 | Rupasov | B82Y 10/00 359/333 |
| 7,177,515 | B2* | 2/2007 | Estes | B82Y 20/00 385/130 |
| 8,050,531 | B2* | 11/2011 | Rahman | B82Y 20/00 250/493.1 |
| 2003/0147616 | A1* | 8/2003 | Dickson | B82Y 20/00 385/129 |
| 2003/0223668 | A1* | 12/2003 | Breukelaar | G02F 1/035 385/2 |
| 2006/0260674 | A1* | 11/2006 | Tran | G11C 13/02 136/252 |
| 2010/0316325 | A1* | 12/2010 | Okamoto | B82Y 20/00 385/3 |
| 2012/0212375 | A1* | 8/2012 | Depree, IV | B82Y 10/00 343/700 MS |
| 2018/0246351 | A1* | 8/2018 | Ho | G02F 1/01708 |

OTHER PUBLICATIONS

Babicheva et al., "Bismuth Ferrite for Active Control of Surface Plasmon Polariton Modes", 8th International Congress on Advanced Electromagnetic Materials in Microwaves and Optics—Metamaterials, IEE, Aug. 25, 2014, pp. 319-321, Copenhagen, Denmark, cited in the International Search Report; discussed in the specification.

Dicken et al., "Electrooptic Modulation in Thin Film Barium Titanate Plasmonic Interferometers", Nano Letters, 2008, vol. 8 No. 11, pp. 4048-4052, cited in the International Search Report.

* cited by examiner

ELECTROOPTIC MODULATOR

BACKGROUND OF THE INVENTION

Field of the Invention

The invention relates to electro-optic elements and to optical modulators including the same. It relates to electro-optic phase modulation and devices for enabling optical phase, amplitude and intensity modulation. The elements, devices and modulators may find application, e.g., in optical data- and telecommunications, optical storage and optical sensing.

Description of Related Art

Electro-optic modulators, which are used to encode information of electrical data in an optical signal, are key components in photonic links. The requirements of these devices are high speed, low energy consumption, low optical loss, high modulation depth, compact footprint, and dense integration. So far, optical modulators based on functional materials of compound semiconductors, liquid crystals, $LiNbO_3$, or polymer, have been put into practical use. However, these optical modulators are commonly discrete and bulky, which is a consequence of the diffraction limit of light in dielectric media. It is desirable to have a satisfactory chip-scale device solution fulfilling simultaneously all the requirements imposed on optical modulators. Therefore, new optical technologies and optical materials are highly desired and being explored by the research community. As an approach to solve the challenges or the issues, plasmonic devices, which introduce materials with negative dielectric permittivities (more particularly: materials having a permittivity having a negative real part) to localize and guide light, offer deep sub-diffraction limit light confinement and intrinsic broadband behavior. As a result, both low energy consumption benefiting from the enhanced light-matter interaction and small optical device footprints as desired for dense device integration can be achieved. As for the functional optical materials, solid ferroelectric materials, which exhibit large electro-optic effects with fast responses, can be used for fast, integrated and energy-efficient active optical devices. The complex refractive indices of the ferroelectric materials and subsequently the phase and/or amplitude of the incident guided light can be modulated by applying external electrical fields. A combination of both, plasmonic waveguiding mechanism and ferroelectric materials, is a promising technology to realize new-generation optical modulators with a desired and superior device performance.

In Viktoriia E. Babicheva et al., "Bismuth ferrite for active control of surface plasmon polariton modes", 2014 8th International Congress on Advanced Electromagnetic Materials in Microwaves and Optics, 20140825 IEEE, p. 319-321, a plasmonic modulator including a plasmonic waveguide having a bismuth ferrite core that is sandwiched between metal plates, which also serve as electrodes.

SUMMARY OF THE INVENTION

Potential objects of the invention are one or more of:
to enable light modulation at very high frequencies;
to provide plasmonic waveguides of high modulation efficiency;
to provide plasmonic waveguides of particularly small size;
to make possible to produce electro-optic elements, in particular phase modulators, and optical modulators on wafer level;
to reduce energy consumption of electro-optic components;
to integrate plasmonic waveguides in standard semiconductor manufacturing processes, in particular in CMOS technology or in Micro-Electro-Mechanical System technology;
to enable reliable light modulation at elevated temperatures, e.g., above 100° C.; in particular, corresponding electro-optic elements shall be provided.

Further objects and various advantages emerge from the description and embodiments below.

The electro-optic element includes a first waveguide, which is a plasmonic waveguide, including:
a first core including a ferroelectric material; and
a cladding including a first cladding portion including, at a first interface with the ferroelectric material, a first cladding material having a permittivity having a negative real part;

the element including a first and a second electrode for producing an electric field in the ferroelectric material when a voltage is applied between the first and second electrodes, for modulating at least a real part of a refractive index of the ferroelectric material, the element including, in addition, a crystalline substrate on which the ferroelectric material is grown, in particular epitaxially grown, with zero or one or more intermediate layers present between the substrate and the ferroelectric material, wherein the one or more intermediate layers, if present, are grown, in particular epitaxially grown, on the substrate, the substrate and the first core being stacked in a direction referred to as vertical direction, and directions perpendicular to the vertical direction are referred to as lateral directions.

This way, a core with high-quality ferroelectric material, in particular of high crystallinity and with a low defect density, can be produced, such that the core and in particular the ferroelectric material can have particularly good optical properties.

By means of the electric field, phases of plasmon polariton modes present at the interface can be modulated.

In the first waveguide, modes can be guided ("guided modes") which may be, dependent on properties of the waveguide, plasmon polariton modes and/or hybrid plasmonic-photonic modes.

The electro-optic element can be used for modulating phases of plasmon polariton modes of a frequency f at the interface by modulating an applied electric field. Thus, more specifically, the first cladding material usually has, at the frequency f, a negative real part of a permittivity, enabling the existence of plasmons.

Specifically, it is the electric field in the ferroelectric material present at the first interface by means of which at least a real part of a refractive index of the ferroelectric material present at the first interface can be modulated. For modulating hybrid plasmonic-photonic modes, an electric field present throughout the ferroelectric material can be used for modulating the real part of a refractive index of the ferroelectric material.

In one embodiment, the substrate is a semiconductor substrate or an oxide substrate such as a semiconductor oxide substrate, in particular a silicon substrate or a silicon oxide substrate.

In one embodiment, the substrate is made of a ferroelectric material. In particular, the substrate can be made of the same ferroelectric material as the ferroelectric material comprised in the first core. E.g., both, the ferroelectric material included in the first core and the ferroelectric material of the substrate, can be $LiNbO_3$, or $BaTiO_3$, or (1-x)[Pb(Mg$_{1/3}$Nb$_{2/3}$O$_3$)]-x[PbTiO$_3$] (with the same x); but other ferroelectric materials can be used, too. It can in particular be provided in such an embodiment, that no intermediate layer is present between the substrate and the ferroelectric material of the core.

In one embodiment, the substrate and the ferroelectric material included in the first core are different portions of one and the same ferroelectric single crystal, e.g., of one and the same crystal of LiNbO$_3$, or BaTiO$_3$, or (1-x)[Pb(Mg$_{1/3}$N$_{2/3}$O$_3$)]-x[PbTiO$_3$]. The ferroelectric single crystal, being a unitary part, can provide in such an embodiment, that no intermediate layer is present between the substrate and the ferroelectric material of the core.

The first and second electrodes can be present on the substrate and/or can establish the cladding (or at least the first cladding portion), in particular in the two last-mentioned embodiments (with the ferroelectric substrate and with the single crystal, respectively).

The first core, when homoepitaxial with the substrate, e.g., like in the two last-mentioned embodiments, can include (and in particular be) a protrusion protruding from the substrate, e.g., such that the protrusion protrudes vertically from the substrate, and the substrate is, at least along one lateral direction, laterally extended beyond the corresponding lateral extension of the protrusion. Furthermore, the first and second electrodes can be located on the substrate while laterally sandwiching the protrusion.

Typically, the substrate is plate-shaped.

Typically, the first waveguide is a waveguide for guiding plasmon polariton modes along lateral directions.

Light to be modulated using the electro-optic element can in particular be infrared light, but more generally can be any electromagnetic radiation, in particular light in the infrared and/or in the visible and/or in the ultraviolet range.

In one embodiment the cladding includes a second cladding portion different from and typically separate from, i.e. at a distance from, the first cladding portion, which includes, at a second interface with the ferroelectric material, a second cladding material having a permittivity having a negative real part. This way, an improved confinement can be achieved.

Typically, the first core is arranged between the first and the second cladding portions.

In one embodiment, the first electrode establishes the first cladding portion, in particular wherein the first cladding material is a metallic material.

If the above-mentioned second cladding portion is present, it may be provided that the second electrode establishes the second cladding portion. In particular, the second cladding material is a metallic material. This can result in an improved confinement. Alternatively, the second cladding material is a non-metallic electrically conductive material. This can facilitate the manufacture of very high quality ferroelectric materials, in particular ferroelectric materials with excellent optical properties.

In one embodiment in which the above-mentioned second cladding portion is present, the ferroelectric material is arranged laterally between the first and second cladding portions, in particular wherein the first electrode establishes the first cladding portion and the second electrode establishes the second cladding portion.

It may in particular be provided that the first and second electrodes are structured and arranged to produce an electric field having an at least predominantly laterally aligned electric field vector across the functional ferroelectric materials, including the first and second interfaces, when a voltage is applied between the first and second electrodes.

The first cladding material may be a metallic material and the second cladding material may also be a metallic material.

The first and second electrodes may establish the first and second cladding portions.

In one embodiment, the ferroelectric material is arranged vertically between the first cladding portion and the substrate, and the first and second electrodes are structured and arranged to produce an electric field having an at least predominantly laterally aligned electric field vector across the functional ferroelectric materials, including the first interface, when a voltage is applied between the first and second electrodes, in particular wherein the first electrode establishes the first cladding portion. The first cladding material may be a metallic material. This embodiment can optionally do without a second cladding having a negative real part of the permittivity.

This electric field arrangement can facilitate integration of the electro-optic element in commercially used semiconductor manufacturing processes.

In one embodiment, the second electrode is made of a non-metallic electrically conductive material, in particular of a transparent non-metallic electrically conductive material (transparent for light to be coupled into the first waveguide). More particularly, the second electrode includes a laterally aligned layer of a non-metallic electrically conductive material which is optionally transparent.

Optionally, the non-metallic electrically conductive material has a permittivity having a negative real part. In this case, the second electrode may constitute the second cladding portion.

In one embodiment, the element comprises, in addition, a second waveguide which is a photonic waveguide including a second core positioned in proximity to the first waveguide, for enabling evanescent coupling between the first and second waveguides, in particular wherein the second waveguide is arranged vertically between the substrate and the first waveguide. This can strongly contribute to a high-intensity integration of the electro-optic element.

The second waveguide is typically provided for guiding photonic light modes along propagation directions that are lateral directions, and in particular first and second waveguides may be running parallel to one and the same lateral direction, while being vertically and/or laterally displaced with respect to each other.

The evanescent coupling between the first and second waveguides is usually present when photonic light modes propagate in the second waveguide. By means of the evanescent coupling (which requires close proximity of the first and second cores), photonic light modes present in the second waveguide can excite guided modes, in particular plasmon polariton modes, in the first waveguide; and, vice versa, modes (in particular plasmon polariton modes) guided in the first waveguide can excite photonic light modes in the second waveguide.

The second core may be made of silicon. Silicon is transparent for, e.g., infrared light.

The invention includes also various optical modulators including an electro-optic element of the described kind.

Accordingly, ultra-compact, fast and energy efficient optical phase modulators can be obtained by the described invention. The electro-optic element may include an active (i.e. modulatable) waveguide core based on a plasmonic metal-insulator-metal (MIM) or metal-insulator (MI) waveguide, wherein the core includes or even consists of ferroelectric materials. The ferroelectric material could be any one, such as LiNbO$_3$, KNO$_3$, KTa$_x$Nb$_{1-x}$O$_3$, Ba$_x$Sr$_{1-x}$TiO$_3$, SrBaNbO$_3$, K$_3$Li$_2$Nb$_5$O$_{15}$, K$_x$Na$_{1-x}$Sr$_y$Ba$_{1-y}$—Nb$_2$O$_6$, $KH_2PO_4$, $KH_2AsO_4$, $NH_4H_2PO_4$, $ND_4D_2PO_4$, $RbH_2AsO_4$, $KTiOPO_4$, $KTiOAsO_4$, $RbTiOPO_4$, $RbTiOAsO_4$, $CsTiOAsO_4$, $Pb(Zr_xTi_{1-x})O_3$, La-doped $Pb(Zr_xTi_{1-x})O_3$, $(1-x)[Pb(Mg_{1/3}Nb_{2/3}O_3]-x[PbTiO_3]$, or $(1-x)[Pb(Zr_{1/3}Nb_{2/3}O_3]-x[PbTiO_3]$, $(0<x<1; 0<y<1)$, but is not limited thereto. Also, ferroelectric materials can be synthetized artificially, based on non-ferroelectric materials. Moreover, ferroelectric materials are not necessarily in their phases exhibiting ferroelectricity but can be in any phases, provided that the materials exhibit the desired electro-optic effect. The ferroelectric material is typically sandwiched between two conductive materials so that a voltage can be applied across the material which can provide an electro-optic effect. I.e. the complex refractive index of the ferroelectric material can be changed via an applied electric field. The metallic materials of the electrodes and conductive claddings, respectively, can be Au, Ag, Pt, Al, Cu, W, and Ti, but are not limited to these aforementioned metals; preferably CMOS process-compatible metals such as Cu or W can be used. If a non-metallic electrically conductive material is used (e.g., as the material of the second electrode), it may be a conductive oxide such as $SrRuO_3$, $LaSrCoO_3$, $LaNiO_3$, indium tin oxide, or other conductive materials such as graphene, but it is not limited thereto. Non-metallic electrically conductive materials can be used as interfacial materials (cladding) at the ferroelectric material (core) to reduce leakage currents through the ferroelectric material.

BRIEF DESCRIPTION OF THE DRAWINGS

Below, the invention is described in more detail by means of examples and the included drawings. The figures are schematic illustrations.

FIG. 1 is a cross-sectional view illustrating an example of a dielectrically loaded metal-insulator-metal plasmonic waveguide based ferroelectric material integrated plasmonic phase modulation element according to a first embodiment.

FIG. 2 is a cross-sectional view illustrating an example of a dielectrically loaded metal-insulator plasmonic waveguide based ferroelectric material integrated plasmonic phase modulation element according to a second embodiment of the invention.

FIG. 3 is a cross-sectional view illustrating an example of an oxide substrate-based ferroelectric material integrated plasmonic phase modulation element in a horizontal metal-insulator-metal plasmonic waveguide structure according to a third embodiment of the invention.

FIG. 4 is a cross-sectional view illustrating an example of an oxide substrate-based ferroelectric material integrated plasmonic phase modulation element in a vertical metal-insulator-metal plasmonic waveguide structure according to a fourth embodiment of the invention.

FIG. 5 is an example of a plane view illustrating plasmonic phase modulation elements in a finite input response optical filter configuration such as a Mach-Zehnder or a delay interferometer.

FIG. 6 is an example of a plane view illustrating a plasmonic phase modulation element in an infinite input response filter type standing-wave optical resonator such as an optical Fabry-Perot resonator.

FIG. 7 is an example of a plane view illustrating a plasmonic phase modulation element in an infinite input response filter type traveling-wave optical resonator such as an optical ring resonator.

FIG. 8 is an example of a plane view illustrating plasmonic phase modulation elements in a Mach-Zehnder interferometer configuration with a very compact arrangement of electrodes and claddings.

FIG. 9 is an example of a plane view illustrating plasmonic phase modulation elements in an IQ modulator arrangement based on parallel connected Mach-Zehnder interferometers.

DETAILED DESCRIPTION OF THE INVENTION

Figure 1:
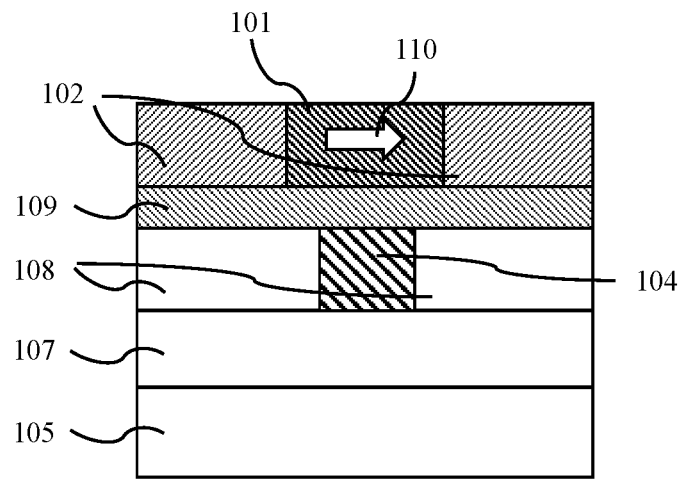
FIGS. 1 to 4 illustrate electro-optic elements.
Figure 1A:
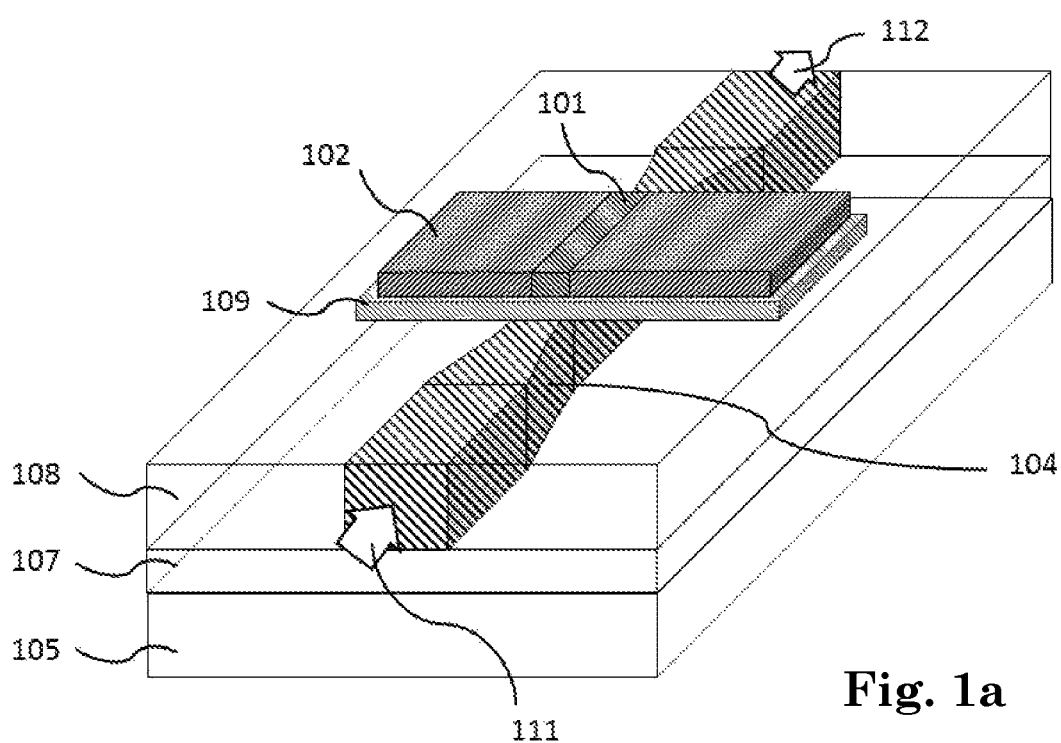
FIG. 1a is a perspective view of the electro-optic element of FIG. 1.

The described embodiments are meant as examples or for clarifying the invention and shall not limit the invention.
First Embodiment FIG. 1 shows a cross-sectional view illustrating an example of an electro-optic element, more particularly of a dielectrically loaded metal-insulator-metal plasmonic waveguide based ferroelectric material integrated plasmonic phase modulation element according to a first embodiment. The figure is taken in a transect plane perpendicular to the waveguide propagation direction. FIG. 1a is a perspective view of the electro-optic element of FIG. 1.

On a substrate or substrate layer 105, further layers and structures are provided, in particular by epitaxial growth, i.e. a buffered insulator layer 107 and a top device layer in which a core 104 ("second core") of an optical waveguide ("second waveguide") is structured. The material at 108 of the device layer adjacent to core 104 has a lower refractive index than that of the core 104 at the device operating wavelengths, i.e. at the wavelength of light guided in the second waveguide to be coupled, at least in part, into a first (plasmonic) waveguide, which is described below. Here, a Si-on-Insulator wafer is taken as an example. Core 104 of the second waveguide is made in the Si device layer. $SiO_2$ or other dielectric materials 108 including but not limited to SiN, SiON, or polymers, may be surrounding the waveguide core 104 within the device layer, as shown in FIG. 1. The desired properties of the filled dielectric materials at 108 include low optical losses and low refractive indices compared to that of the core 104. A ferroelectric material 101 is then deposited on top by suitable material growth or deposition approaches (typically by epitaxial growth), including but not limited to radio-frequency sputtering, pulse laser deposition, metal organic chemical vapor deposition, molecular beam epitaxy, chemical solution deposition, or a mixture of the aforementioned approaches. The ferroelectric material 101 establishes a core ("second core") of a first waveguide. Single or multiple buffer layers and/or seed layers 109 can optionally be inserted in-between the Si-based device layer beneath (at 108 and 104) and the ferroelectric material 101 as e.g. a spacer or to reduce the lattice mismatch and improve the epitaxial quality of the ferroelectric material 101. Post-deposition annealing may be used to improve the crystal quality of the ferroelectric material at 101. Ferroelectric material 101 is laterally sandwiched by metal or non-metal electrically conductive materials 102, which are used as lateral cladding materials. So, metals or the non-metal electrically conductive materials are electrically isolated by the central ferroelectric dielectric blocks. Plasmonic waveguides are thus established if the real parts of the permittivities of the metals and the non-metal electrically conductive materials, respectively, in the cladding of the first waveguide are below zero at the device operating wavelength and provided the ferroelectric material 101 in the core has a positive real part of its permittivity. The surface plasmon polariton modes can be guided along the direction perpendicular to the plane of the paper. Assisted by the plasmonic waveguiding mechanism, the width of the ferroelectric material block can be much smaller than the $\Delta/2n$, where $\Delta$ is device operating wavelength and n is the refractive index of the ferroelectric material 101. Guided modes (plasmon polariton modes, hybrid plasmonic-photonic modes) can be strongly confined inside the ferroelectric material. Metals or non-metallic electrically conductive materials can also be used as electrodes. When external voltages such as electric modulating signal pulses are applied via the two electrodes, electrical fields (electric field vector visualized at 110) are generated across the ferroelectric material 101, and induce refractive index changes in the ferroelectric material 101 due to electro-optic effects, including the effects due to the ferroelectricity. Subsequently, the surface plasmon polariton modes are modulated by the externally applied voltage. Since very narrow (lateral) widths of the ferroelectric material block can be provided, strong electric fields can be obtained, which can be approximated by the ratios of the applied external voltages and the width of the block of ferroelectric material 101, resulting in significant electro-optic effects.

In FIG. 1a is visible that the core of the second waveguide can have a waist in the region where it overlaps along the (common) waveguide direction with the core of the first waveguide.

Second Embodiment

Figure 2:
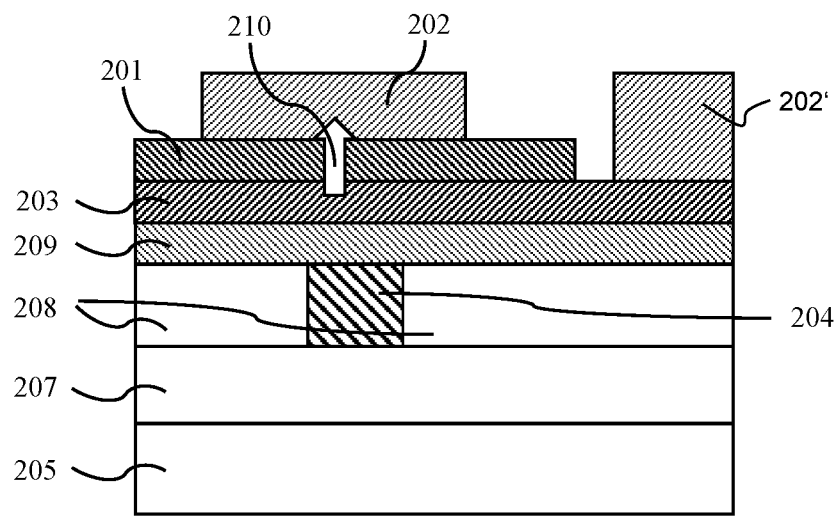
Figure 2A:
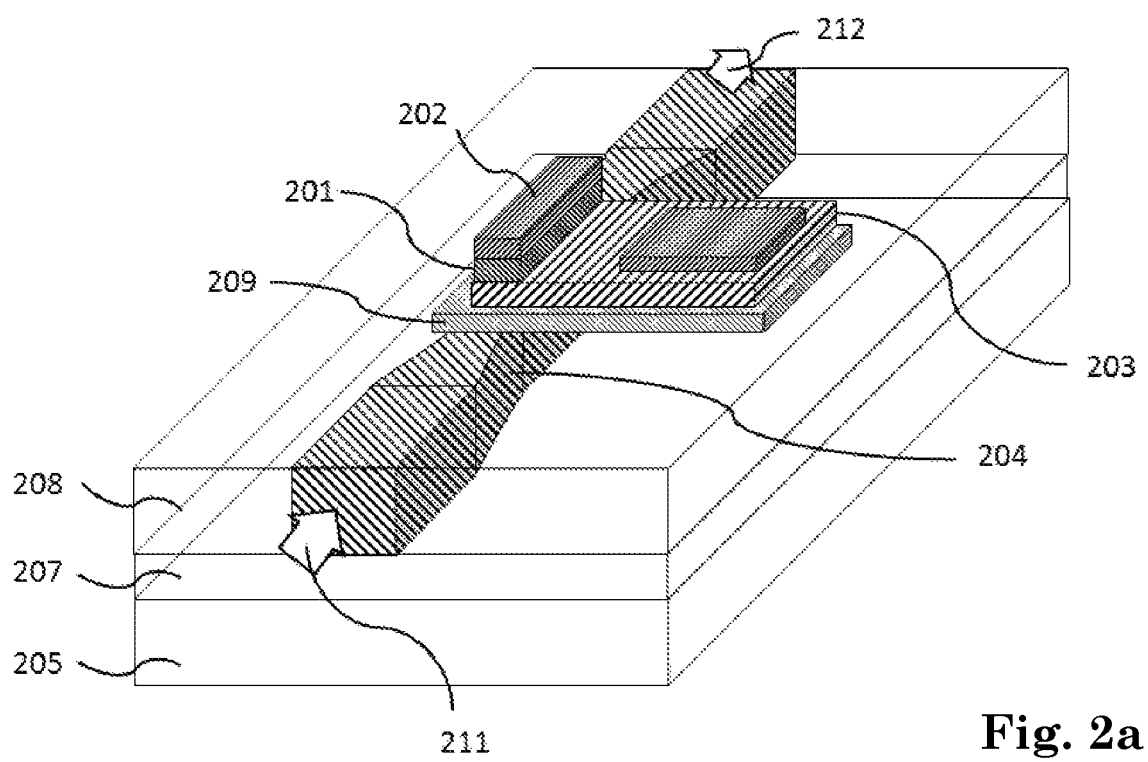
FIG. 2a is a perspective view of the electro-optic element of FIG. 2.

FIG. 2 shows a cross-sectional view illustrating an example of a dielectrically loaded metal-insulator plasmonic waveguide based ferroelectric material integrated plasmonic phase modulation element according to a second embodiment of the invention. The figure is taken in a transect plane perpendicular to the waveguide propagation direction. FIG. 2a is a perspective view of the electro-optic element of FIG. 2.

As shown in FIG. 2, this embodiment is different from the phase modulation element of the first embodiment in the formation of the plasmonic waveguide (first waveguide, ferroelectric core at 201) and applied electric field direction 210. Specifically, an electrically conductive material 203, which in particular may be non-metallic, is deposited on top of the layer stack including substrate 205 and buffered insulator 207 and a device layer with the second waveguide having a higher refractive index core 204 than the buffered insulator layer 207 beneath (e.g. Si core 204 and $SiO_2$ insulator layer 207 of an initial Si-on-insulator wafer). Also, as described in the first embodiment, buffer layers and/or seed layers 209 may be present, if necessary. The ferroelectric material 201 is deposited on top of the electrically conductive material 203. A metal or non-metal electrical conductive material 202 whose real part of the permittivity is negative is coated on top of the ferroelectric material 201. Hence, a plasmonic waveguide is formed with ferroelectric material 201 constituting the core and material 202 constituting a cladding portion. The confinement of the guided modes, in particular of the surface plasmon polariton modes, in the ferroelectric material 201 is strengthened, generating an enhanced light-matter interaction. Voltages can be applied between the top material 202 and the electrically conductive material 203 below the ferroelectric material 201, generating vertical electric fields (cf. electric field vector 210), wherein metal 202' may be applied on electrically conductive material 203 in particular if electrically conductive material 203 is non-metallic. The electric fields then induce refractive index changes in the ferroelectric material 201 by means of the electro-optical effect (e.g., the effect due to the ferroelectricity). This is then used to modulate the optical signal via the surface plasmon polariton modes or the hybrid plasmonic-photonic modes.

Third Embodiment

Figure 3:
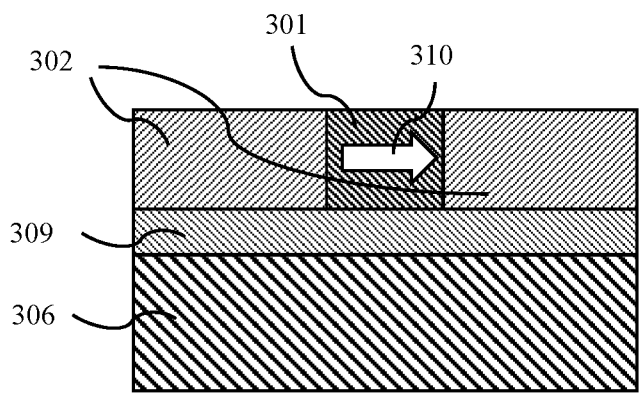

FIG. 3 shows a cross-sectional view illustrating an example of an oxide substrate-based ferroelectric material integrated plasmonic phase modulation element in a horizontal metal-insulator-metal plasmonic waveguide structure according to a third embodiment of the invention. This embodiment, an oxide substrate 306 is employed, such as MgO, $Al_2O_3$, $SrTiO_3$, and $LaSrAlTaO_6$. The choice of substrate materials is not limited to the aforementioned materials. Substrate materials that assist epitaxial growth of the ferroelectric material 301 and possesses a smaller refractive indices (real part) than the ferroelectric material 301 are preferred. Buffer layers and/or seed layers 309 can be introduced if necessary. Ferroelectric materials 301 are laterally sandwiched by metals 302, which are used as lateral cladding materials. Hence, surface plasmon polariton modes are supported. Guided modes are tightly confined in the ferroelectric materials 301 that are used as the core of the plasmonic waveguide. Voltages are applied across the electrodes established by the metals at 302 which are separated by the insulating ferroelectric material 301, generating horizontal electric fields (cf. at 310) across the ferroelectric material 301. The phases or amplitudes of an optical signal can then be modulated by means of the electro-optic effect. This embodiment may provide a particularly strong confinement of the guided modes inside the ferroelectric material 301 because of an excellent ferroelectric material quality obtainable by a suitable choice of the substrate crystal structure.

Fourth Embodiment

Figure 4:
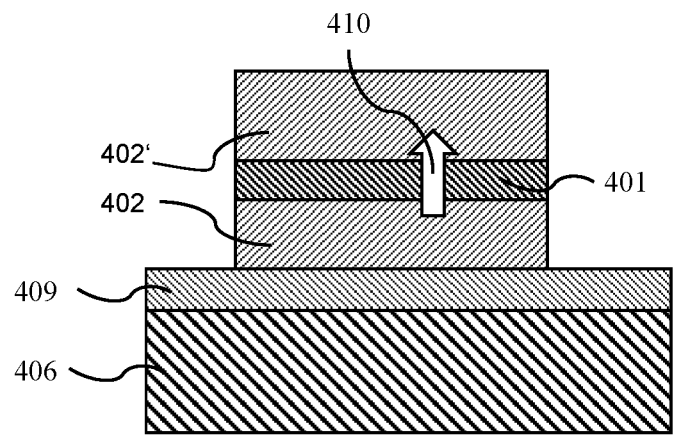

FIG. 4 shows a cross-sectional view illustrating an example of an oxide substrate-based ferroelectric material integrated plasmonic phase modulation element in a vertical metal-insulator-metal plasmonic waveguide structure according to a fourth embodiment of the invention. As shown in the figure, metal or non-metallic electrically conductive material 402 is deposited on top of an oxide substrate material 406. Buffer layers and/or seed layers 409 can be inserted between the oxide substrate 406 and the metal or non-metal electrically conductive material 402 if needed. Ferroelectric material 401 is then deposited on top of the material 402 and used as an electro-optic material of a core of a plasmonic waveguide. Material 402' having a permittivity having a negative real part are coated on top of the ferroelectric material 401. Hence, a plasmonic waveguide is created, and guided modes can be strongly confined inside the ferroelectric material 401. External voltages may be applied from the top layer material 402' to the material 402 below the ferroelectric material 401, inducing an electric field 410 having a vertical electric field vector, which then can lead to refractive index and/or absorption changes due to the electro-optic effect in the ferroelectric material 401. This embodiment may provide particularly good ferroelectric material qualities and thus strong electro-optic effects because of an excellent ferroelectric material quality obtainable by a suitable choice of the substrate crystal structure.

Fifth Embodiment

Figure 5:
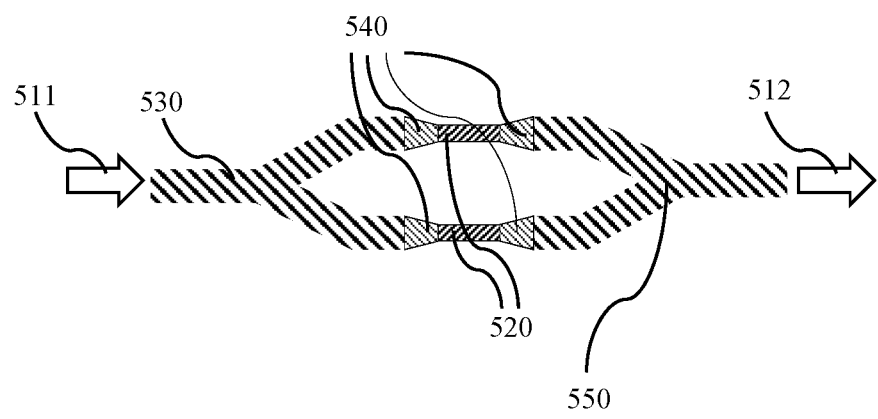
FIGS. 5 to 9 illustrate optical modulators.

FIG. 5 shows an example of a plane view illustrating plasmonic phase modulation elements 520 in a finite input response optical filter configuration such as a Mach-Zehnder or a delay interferometer. The interferometer includes two optical phase modulation elements (referenced 520) described in the present patent application. In this optical modulator, inputted light 511 is split into two light paths, each of which is phase-modulated by an electro-optic element described in the present patent application functioning as a phase modulation element, and finally, the light is recombined so as to become output light 512. Hence, a phase modulation induced by the elements 520 is transferred to an intensity modulation by interference of the two phase-modulated light portions. A push-pull configuration, where phase shifts of opposite polarities are generated in the two arms of the Mach-Zehnder interferometer, can be employed. As a result, the lengths of the plasmonic phase modulation elements 520 can be reduced to half (compared to using only one element 520). The waveguides 530 and optical power splitters can be realized by continuously connected Si-based waveguides 530 or by waveguides made in other materials that have higher refractive indices than cladding materials beneath and that are optically transparent or have acceptable optical losses in the device's operating wavelength range. The configuration of the splitter can be e.g. based on a Y-shape splitter 550 as drawn in the figure, or on a directional coupler, or on a Multi-Mode Interference mode splitting structure. Adiabatic tapering structures 540 can be inserted to improve the mode matching and light transmission from the access waveguides 530 to the plasmonic waveguides 520. Benefiting from the plasmonic waveguides in the phase modulation elements 520, the device length can be as short as a few micrometers.

Sixth Embodiment

Figure 6:
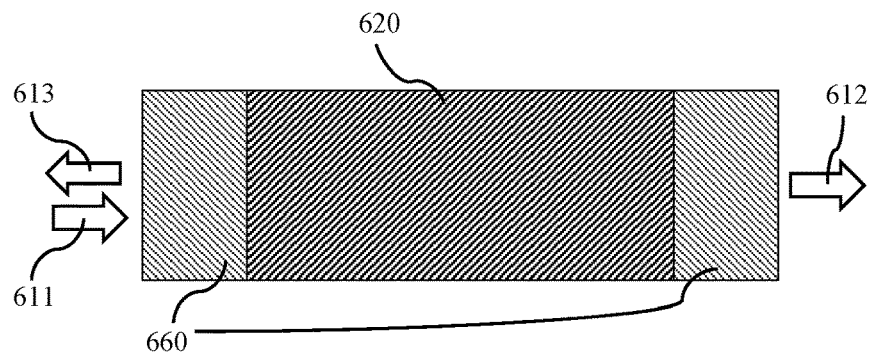

FIG. 6 is an example of a plane view illustrating a plasmonic phase modulation element 620 in an infinite input response filter type standing-wave optical resonator such as an optical Fabry-Perot resonator establishing an optical modulator. The modulator includes two spatially separated optical reflectors 660 and a central ferroelectric materials integrated plasmonic phase modulation element (referenced 620) as described in the present patent application. The optical reflectors 660 can be embodied as reflective coatings, distributed Bragg reflectors, distributed feedback reflectors, gratings, or photonic crystal mirrors. Only incident light 611 coinciding with resonance wavelengths of the optical resonator can transmit through the optical resonator. The resonant wavelengths of the resonator can be shifted by applying external voltages to the plasmonic phase modulation elements (referenced 620) as herein described. Then, phase modulations are transferred to intensity modulations by comparing the light power intensity changes of either the light transmission through 612 (output at the transmission port) or light reflection back from 613 the optical resonator (output at the reflection port) before and after the modulation.

Seventh Embodiment

Figure 7:
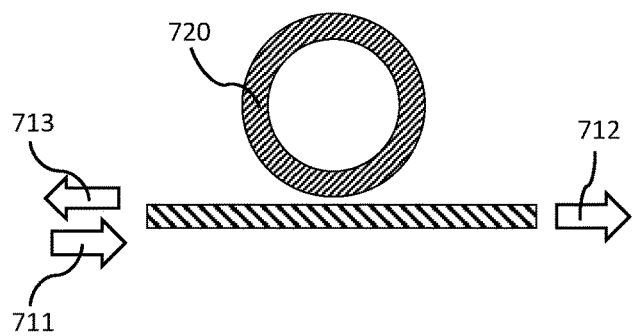

FIG. 7 shows an example of a plane view illustrating a plasmonic phase modulation element in an infinite input response filter type traveling-wave optical resonator such as an optical ring resonator 720. At least a part of the ring resonator 720 is embodied by the plasmonic phase modulation element described in the present patent application. Incident light 711 coinciding with a resonance wavelength of the optical ring resonator 720 can enter the ring resonator 720 and exhibit a reduced transmission or enhanced reflection. The resonant wavelengths of the resonator can be shifted by applying external voltages to the plasmonic phase modulation elements (referenced 720) as herein described. Therefore, phase modulations are transferred to intensity modulations by comparing either the transmission 712 or reflected light 713 power intensity changes before and after modulation.

Eighth Embodiment

Figure 8:
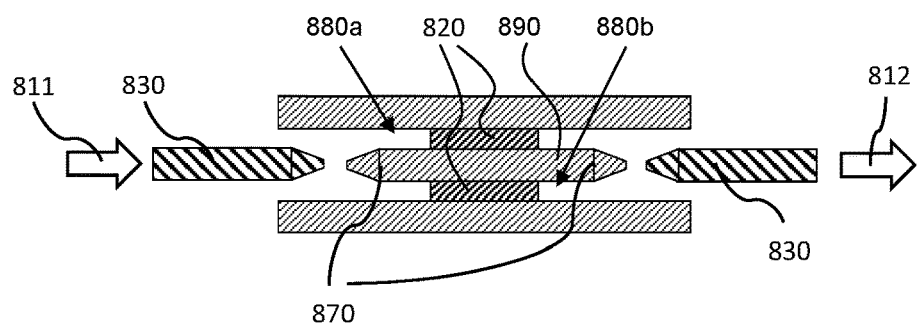

FIG. 8 shows an example of a plane view illustrating plasmonic phase modulation elements 820 in a Mach-Zehnder interferometer configuration with a very compact arrangement of the metals. Incident light 811 launched from an access waveguide 830 is converted from photonic to plasmonic and/or hybrid modes and split apart by a metallic Y-tip 870. Two surface plasmon polariton modes are guided into the two ferroelectric materials integrated plasmonic phase modulation elements 820 in the upper 880a and lower 880b arms of the Mach-Zehnder interferometer. The two phase modulation elements 820 may share metal 890 as the plasmonic waveguide claddings and the electrodes, as illustrated in the figure. The optical modulator may have very compact device dimensions. By applying external voltages to modulate optical properties of the ferroelectric materials in the plasmonic phase modulation elements, information can be encoded in the phases of the surface plasmon polariton modes propagating in the upper and lower arm of the Mach-Zehnder interferometer. At the end of the modulator, the plasmonic-photonic mode interferometer is utilized to convert the phase modulation into an intensity modulation of the output light 812 by selectively mode coupling only to the preferred plasmon polariton modes.

Ninth Embodiment

Figure 9:
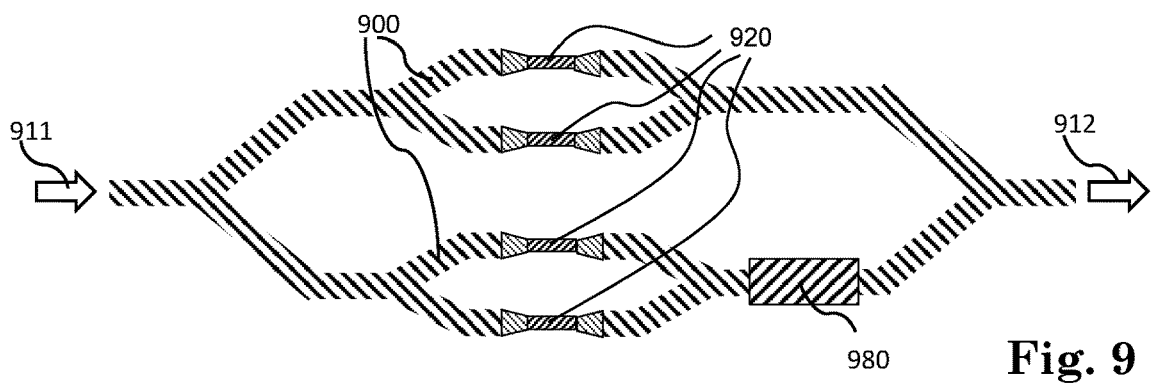

FIG. 9 is an example of a plane view illustrating plasmonic phase modulation elements in an IQ modulator arrangement based on parallel connected Mach-Zehnder interferometers. In one arm of the first stage of the Mach-Zehnder interferometer, there is one second-stage Mach-Zehnder interferometer 900 with ferroelectric material integrated plasmonic phase modulation elements as herein described. The Mach-Zehnder interferometer 900 can be realized, e.g., by a design as described in FIG. 5 or FIG. 8. In the other arm, there are one 90 degree phase shifter 980 and another second-stage Mach-Zehnder interferometer 900 with ferroelectric material integrated plasmonic phase modulation elements 920 as described by the previous embodiments of the present invention. The phase shifter 980 can be embodied using ferroelectric material integrated plasmonic phase modulation elements as herein described or they can be based on any other optical device configurations and optical effects such as the mechanical-optic, thermal-optic effect, electro-optic, carrier plasma dispersion effect, acoustic-optic effect, Franz-Keldysh effect, quantum confined stark effect, and light absorption or gain associated phase change effect induced in optical materials.

Tenth Embodiment

Figure 10:
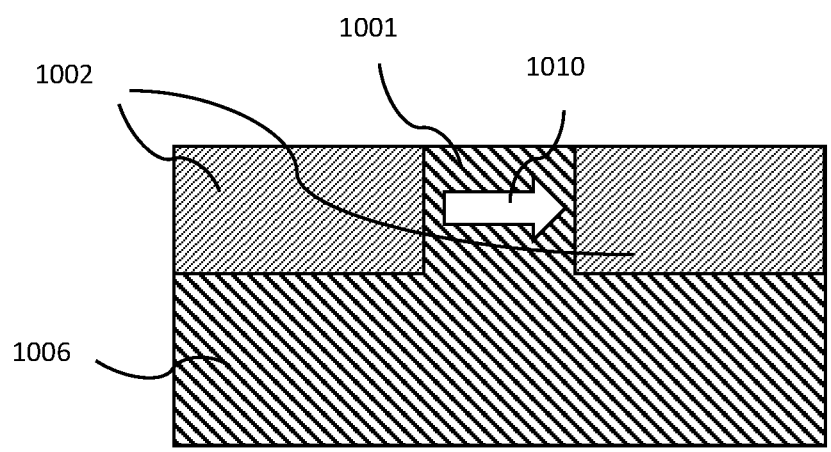
FIG. 10 is a cross-sectional view illustrating an example of an electro-optic element in which the substrate and the first core are different portions of one and the same ferroelectric single crystal, embodied as a plasmonic phase modulation element in a horizontal metal-insulator-metal plasmonic waveguide structure according to a tenth embodiment of the invention.

FIG. 10 shows a cross-sectional view illustrating an example of a plasmonic phase modulation element in a horizontal metal-insulator-metal plasmonic waveguide structure based on a substrate 1006 of a ferroelectric material according to a tenth embodiment of the invention. In this embodiment, a ferroelectric material substrate 1006 is employed, such as a single crystal of $LiNbO_3$, of $BaTiO_3$, or of $(1-x)[Pb(Mg_{1/3}Nb_{2/3}O_3]-x[PbTiO_3]$. The choice of the substrate materials is not limited to the aforementioned materials. The ferroelectric material (cf. at 1001) of the core of the waveguide structure is laterally sandwiched by metallic materials (cf. at 1002) which are present on the ferroelectric substrate 1006 and which can function as lateral waveguide cladding materials. Guided modes are tightly confined in the ferroelectric material 1001 that is used as the core of the plasmonic waveguide. Voltages can be applied across the electrodes established by the metallic materials at 1002 which are separated by the (electrically insulating) ferroelectric material at 1001, generating horizontal electric fields (cf. the arrow at 1010) across the ferroelectric material at 1001 of the core. One or more phases and/or one or more amplitudes of an optical signal can thereby be modulated by means of the electro-optic effect.

The core of the waveguide (cf. at 1001) and the substrate (cf. at 1006) are in this embodiment homoepitaxial with each other and are, in other words, different portions of one and the same ferroelectric single crystal.

Electro-optic elements in which the waveguide core and the substrate include (e.g., are) different portions of one and the same ferroelectric single crystal such as, e.g., illustrated in FIG. 10, turned out to show a particularly good performance. They can, for example, be manufactured including growing the ferroelectric single crystal, followed by removing a portion of the ferroelectric material to produce a protrusion, the protrusion establishing a waveguide core protruding from a portion of the single crystal establishing the substrate. The removing of the ferroelectric material can be accomplished by, e.g., selective etching. Electrodes that can, in addition, function as claddings for the waveguide core, can be produced by coating, e.g., metallizing, side walls of the protrusion, wherein the side walls can in particular be mutually opposing side walls of the protrusion.

As described before, the cladding material, where it interfaces the ferroelectric material of the core, e.g., the metal used for coating/metallizing the side walls, can have a permittivity having a negative real part.

Since the portion of ferroelectric material comprised in the core and the portion of ferroelectric material establishing the substrate are grown upon each other, namely by growing the initial single crystal from which a portion is removed in order to produce (i.e. to set free) the side walls of the core, and considering that (finally) the ferroelectric material of the core is present on the substrate, the ferroelectric material of the core is grown on the substrate or, expressed slightly differently, the substrate can be referred to as a substrate on which the ferroelectric material of the core is grown.

The invention claimed is:

1. An electro-optic element, configured to modulate light by use of an electro-optic effect and comprising a first waveguide, which is a plasmonic waveguide, comprising:
a first core comprising a ferroelectric material, wherein the ferroelectric material establishes the first core; and
a cladding comprising a first cladding portion comprising, at a first interface with the ferroelectric material, a first cladding material having a permittivity having a negative real part;
the element comprising a first electrode and a second electrode for producing an electric field in the ferroelectric material when a voltage is applied between the first and second electrodes, for modulating at least a real part of a refractive index of the ferroelectric material by the electro-optic effect, the element comprising, in addition, a crystalline substrate and a second wavequide which is a photonic waveguide comprising a second core positioned in proximity to the first waveguide, for enabling evanescent coupling between the first and second waveguides, wherein the substrate and the first core are stacked in a direction referred to as a vertical direction, and directions perpendicular to the vertical direction are referred to as lateral directions.

2. The electro-optic element according to claim 1, comprising a ferroelectric single crystal, wherein the ferroelectric material establishing the first core and the crystalline substrate comprise different portions of the ferroelectric single crystal.

3. The electro-optic element according to claim 1, wherein the cladding comprises a second cladding portion separate from the first cladding portion, comprising, at a second interface with the ferroelectric material, a second cladding material having a permittivity having a negative real part.

4. The electro-optic element according to claim 1, wherein the first electrode establishes the first cladding portion.

5. The electro-optic element according to claim 3, wherein the ferroelectric material is arranged laterally between the first and second cladding portions.

6. The electro-optic element according to claim 1, wherein the ferroelectric material is arranged vertically between the first cladding portion and the crystalline substrate, and wherein the first and second electrodes are structured and arranged to produce an electric field having, at the first interface, an at least predominantly vertically aligned electric field vector, when a voltage is applied between the first and second electrodes.

7. The electro-optic element according to claim 6, wherein the second electrode comprises a laterally aligned layer of a non-metallic electrically conductive material, which is transparent.

8. The electro-optic element according to claim 6, wherein the second electrode is made of a non-metallic electrically conductive material.

9. The electro-optic element according to claim 1, wherein the second core is present in a layer aligned parallel to the crystalline substrate, the second waveguide comprising, in said layer and adjacent to the second core, two material portions, wherein the second core has an index of refraction which is higher than an index of refraction of any of said two material portions.

10. The electro-optic element according to claim 9, the second waveguide comprising, in the crystalline substrate or in a layer which is arranged vertically between the second core and the substrate, a further material portion which is positioned adjacent to the second core, wherein the second core has an index of refraction which is higher than an index of refraction of said further material portion.

11. The electro-optic element according to claim 1, wherein the element is structured and configured for receiving light, inducing a phase shift of the light and outputting the phase-shifted light.

12. The electro-optic element according to claim 11, wherein the electro-optic element comprises a finite input response optical filter.

13. The electro-optic element according to claim 11, wherein the electro-optic element comprises an infinite input response filter type standing-wave optical resonator.

14. The electro-optic element according to claim 11, wherein the electro-optic element comprises an infinite input response filter type traveling-wave optical resonator.

15. An electro-optic element, comprising a first waveguide, which is a plasmonic waveguide, comprising
a first core comprising a ferroelectric material, wherein the ferroelectric material establishes the first core; and
a cladding comprising a first cladding portion comprising, at a first interface with the ferroelectric material, a first cladding material having a permittivity having a negative real part, the cladding comprising further a second cladding portion separate from the first cladding portion, comprising, at a second interface with the ferroelectric material, a second cladding material having a permittivity having a negative real part;

the element comprising a first and a second electrode for producing an electric field in the ferroelectric material when a voltage is applied between the first and second electrodes, for modulating at least a real part of a refractive index of the ferroelectric material, the element comprising, in addition, a crystalline substrate, wherein the ferroelectric material is grown on the crystalline substrate; or the element comprising, in addition, one or more intermediate layers present between the crystalline substrate and the ferroelectric material and grown on the crystalline substrate, wherein the ferroelectric material is grown on one of the one or more intermediate layers, wherein the crystalline substrate and the first core being stacked in a direction referred to as vertical direction, and directions perpendicular to the vertical direction are referred to as lateral directions, wherein the first cladding material is a metallic material and the second cladding material is a metallic material.

16. The element according to claim 15, wherein the element is configured to modulate light essentially by use of an electro-optic effect.

17. The element according to claim 15, wherein the first and second electrodes establish the first and second cladding portions.

* * * * *